United States Patent
Kim et al.

(10) Patent No.: US 11,309,541 B2
(45) Date of Patent: Apr. 19, 2022

(54) NEGATIVE ELECTRODE SLURRY FOR LITHIUM SECONDARY BATTERY AND METHOD OF PREPARING THE SAME

(71) Applicant: LG CHEM, LTD., Seoul (KR)

(72) Inventors: Dong Hyun Kim, Daejeon (KR);
Houng Sik Yoo, Daejeon (KR);
Byoung Hoon Ahn, Daejeon (KR);
Sang Hoon Choy, Daejeon (KR);
Hyeon Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 190 days.

(21) Appl. No.: 16/641,114

(22) PCT Filed: Aug. 31, 2018

(86) PCT No.: PCT/KR2018/010186
§ 371 (c)(1),
(2) Date: Feb. 21, 2020

(87) PCT Pub. No.: WO2019/045535
PCT Pub. Date: Mar. 7, 2019

(65) Prior Publication Data
US 2021/0126255 A1    Apr. 29, 2021

(30) Foreign Application Priority Data
Sep. 1, 2017   (KR) .......................... 10-2017-0112013

(51) Int. Cl.
*H01M 4/485*     (2010.01)
*H01M 4/04*      (2006.01)
*H01M 4/62*      (2006.01)
*H01M 10/0525*   (2010.01)
*H01M 4/02*      (2006.01)

(52) U.S. Cl.
CPC ............. *H01M 4/485* (2013.01); *H01M 4/04* (2013.01); *H01M 4/623* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | |
|---|---|---|
| 9,455,438 B2 | 9/2016 | Lim et al. |
| 2013/0295455 A1 | 11/2013 | Lim et al. |
| 2014/0199590 A1 | 7/2014 | Tamaki et al. |
| 2018/0198155 A1* | 7/2018 | Park ...................... H01M 4/366 |
| 2019/0252682 A1 | 8/2019 | Takeuchi et al. |
| 2019/0252718 A1 | 8/2019 | Takeuchi et al. |

FOREIGN PATENT DOCUMENTS

| | | |
|---|---|---|
| EP | 3540843 A1 | 9/2019 |
| JP | 2014-194927 A | 10/2014 |
| JP | 2014-225446 A | 12/2014 |
| JP | 2015-153714 A | 8/2015 |
| JP | 2015-176688 A | 10/2015 |
| JP | 2016-46188 A | 4/2016 |
| JP | 2016-177925 A | 10/2016 |
| JP | 6079386 B2 | 2/2017 |
| JP | 2017-143027 A | 8/2017 |
| KR | 10-2013-0116033 A | 10/2013 |
| KR | 10-2015-0098487 A | 8/2015 |
| KR | 10-1649804 B1 | 8/2016 |
| KR | 10-2017-0037454 A | 4/2017 |
| KR | 10-2017-0063372 A | 6/2017 |

OTHER PUBLICATIONS

Machine translation of JP 2015-153714 (Year: 2015).*
International Search Report (PCT/ISA/210) issued in PCT/KR2018/010186, dated Mar. 12, 2019.
Extended European Search Report, dated Jun. 30, 2000 for European Application No. 18850688.5.

* cited by examiner

*Primary Examiner* — Wyatt P McConnell
(74) *Attorney, Agent, or Firm* — Birch, Stewart, Kolasch & Birch, LLP

(57) ABSTRACT

A negative electrode slurry including a lithium titanium oxide, a dispersant including a polar OH group and a non-polar alkyl group, a binder, and a solvent, and a method of preparing the same.

14 Claims, No Drawings

NEGATIVE ELECTRODE SLURRY FOR LITHIUM SECONDARY BATTERY AND METHOD OF PREPARING THE SAME

CROSS-REFERENCE TO RELATED APPLICATIONS

This application claims the benefit of Korean Patent Application No. 10-2017-0112013, filed on Sep. 1, 2017, in the Korean Intellectual Property Office, the disclosure of which is incorporated herein in its entirety by reference.

TECHNICAL FIELD

The present invention relates to a negative electrode slurry for a lithium secondary battery and a method of preparing the same, and more particularly, to a negative electrode slurry having a high solid content, which addresses a problem in which viscosity of the negative electrode slurry comprising lithium titanium oxide (LTO) is increased, and a method of preparing the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Also, recently, in line with growing concerns about environmental issues, a significant amount of research into electric vehicles (EVs) and hybrid electric vehicles (HEVs), which may replace vehicles using fossil fuels, such as gasoline vehicle and diesel vehicle, one of major causes of air pollution, has been conducted.

Nickel-metal hydride (Ni-MH) secondary batteries or lithium secondary batteries having high energy density, high discharge voltage, and high output stability have been used as power sources of the electric vehicles (EVs) and hybrid electric vehicles (HEVs), wherein, since the lithium secondary batteries must be used for 10 years or more under harsh conditions, in addition to high energy density and characteristics capable of exhibiting high output in a short period of time, when the lithium secondary batteries are used in the electric vehicles, significantly better stability and long-life characteristics than those of a conventional small lithium secondary battery are inevitably required. Furthermore, excellent rate capability and power characteristics are required for the secondary batteries used in the electric vehicles (EVs) and hybrid electric vehicles (HEVs) depending on the operating conditions of the vehicles.

A lithium titanium oxide having high lithium (Li) intercalation and deintercalation potential has recently received attention as an active material of a lithium secondary battery. The lithium titanium oxide is advantageous in that fast charge or low-temperature performance is excellent because metallic lithium is not precipitated from the lithium titanium oxide at the lithium intercalation and deintercalation potential. However, since the lithium titanium oxide has lower electrical conductivity of the material itself and lower lithium-ion diffusion rate than a carbon material such as graphite, it is necessary to reduce a particle size in order to obtain a substantially high output, but, in a case in which the particle size of the lithium titanium oxide is reduced, viscosity of a negative electrode slurry comprising the lithium titanium oxide may be increased. Also, since a solid content of the negative electrode slurry must be reduced to address the viscosity issues of the negative electrode slurry, it is disadvantageous in that capacity of the battery is reduced.

Thus, there is a need to develop a negative electrode slurry having appropriate viscosity capable of appropriately forming a negative electrode active material layer on a negative electrode collector while having a high solid content.

DISCLOSURE OF THE INVENTION

Technical Problem

An aspect of the present invention provides a negative electrode slurry having appropriate viscosity while having a high solid content.

Another aspect of the present invention provides a method of preparing the negative electrode slurry.

Another aspect of the present invention provides a negative electrode for a lithium secondary battery, which comprises the negative electrode slurry, and a lithium secondary battery comprising the negative electrode.

Technical Solution

According to an aspect of the present invention, there is provided a negative electrode slurry comprising a lithium titanium oxide (LTO), a dispersant comprising a polar OH group and a non-polar alkyl group, a binder, and an organic solvent.

According to another aspect of the present invention, there is provided a method of preparing the negative electrode slurry which comprises the steps of: (1) preparing a premixed slurry by mixing a binder, a lithium titanium oxide (LTO), a dispersant comprising a polar OH group and a non-polar alkyl group, and an organic solvent; and (2) stirring the premixed slurry, to which the dispersant is added, to disperse the premixed slurry.

According to another aspect of the present invention, there is provided a negative electrode for a lithium secondary battery, which comprises the negative electrode slurry, and a lithium secondary battery comprising the negative electrode.

Advantageous Effects

Since a negative electrode slurry according to the present invention has a high solid content, the negative electrode slurry exhibits appropriate viscosity while achieving a high negative electrode loading amount, and thus, the negative electrode slurry may solve problems in a negative electrode preparation process due to high viscosity of the negative electrode slurry comprising a lithium titanium oxide (LTO).

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A negative electrode slurry of the present invention is a negative electrode slurry for a lithium secondary battery, wherein the negative electrode slurry of the present invention comprises a lithium titanium oxide (LTO), a dispersant comprising a polar OH group and a non-polar alkyl group, a binder, and an organic solvent.

In the present invention, the dispersant comprising a polar OH group and a non-polar alkyl group may denote a dispersant which comprises a repeating unit derived from a monomer containing a polar OH group and a repeating unit derived from a monomer containing a non-polar alkyl group in a molecular structure of the dispersant. Since the dispersant may allow the lithium titanium oxide to be appropriately dispersed in the organic solvent by comprising both a polar OH part capable of being adsorbed on the lithium titanium oxide and a non-polar alkyl part capable of interacting with the organic solvent in its molecular structure, the dispersant may address a problem in which viscosity of the negative electrode slurry comprising lithium titanium oxide (LTO), as a negative electrode active material, is increased, and, accordingly, the negative electrode slurry may have an increased solid content. For this purpose, as the dispersant, the negative electrode slurry of the present invention comprises a dispersant satisfying specific conditions in the negative electrode slurry according to specific conditions.

Specifically, the negative electrode slurry according to an embodiment of the present invention may comprise the dispersant so that type and amount of the dispersant satisfy Equation 1 below.

$$\frac{A}{B \cdot C} \geq 0.06 \quad \text{[Equation 1]}$$

(in Equation 1, A is an amount (wt %) of a repeating unit derived from a monomer containing a polar OH group in the dispersant, B is a weight-average molecular weight (Kg/mol) of the dispersant, and C is parts by weight of the dispersant based on 100 parts by weight of the lithium titanium oxide).

The inventors of the present invention found that desired viscosity of the negative electrode slurry may be achieved when the negative electrode slurry comprises the dispersant so that the dispersant satisfies Equation 1. A value, which is obtained by dividing the amount of the repeating unit derived from the monomer containing a polar OH group in the dispersant by the product of the weight-average molecular weight of the dispersant and the weight of the dispersant based on 100 parts by weight of the lithium titanium oxide, may be 0.06 or more, particularly 0.07 or more, and more particularly 0.08 or more.

Also, an upper limit of the value, which is obtained by dividing the amount (A) of the repeating unit derived from the monomer containing a polar OH group in the dispersant by the product of the weight-average molecular weight (B) of the dispersant and the weight (C) of the dispersant based on 100 parts by weight of the lithium titanium oxide, may be 100, particularly 95, more particularly 50, and most particularly 10.

In a case in which the negative electrode slurry satisfies Equation 1, the negative electrode slurry exhibits appropriate viscosity, and an increase in size of slurry particles included in the negative electrode slurry may be suppressed.

Also, in a case in which the upper limit of the value, which is obtained by dividing the amount (A) of the repeating unit derived from the monomer containing a polar OH group in the dispersant by the product of the weight-average molecular weight (B) of the dispersant and the weight (C) of the dispersant based on 100 parts by weight of the lithium titanium oxide, is satisfied, the negative electrode slurry exhibits appropriate viscosity, and an effect of suppressing the increase in the size of the slurry particles included in the negative electrode slurry may be more effectively achieved.

In an embodiment of the present invention, the amount (wt %) of the repeating unit derived from the monomer containing a polar OH group in the dispersant may be in a range of 1 to 99, particularly 1 to 50, and more particularly 5 to 30.

The weight-average molecular weight (Kg/mol) of the dispersant may be in a range of 10 to 500, particularly 20 to 300, and more particularly 30 to 200.

The weight (parts by weight) of the dispersant based on 100 parts by weight of the lithium titanium oxide may be in a range of 0.01 to 10, particularly 0.1 to 5, and more particularly 0.2 to 3.

Also, the negative electrode slurry according to the embodiment of the present invention may satisfy Equation 2 below.

$$0.05 \leq \frac{\text{Dispersant amount}}{\text{Binder amount}} \leq 3.5 \quad \text{[Equation 2]}$$

(in Equation 2, the amount of the dispersant and the amount of the binder respectively represent parts by weight of the dispersant and the binder based on 100 parts by weight of the negative electrode slurry)

The amount of the dispersant is related to the amount of the binder included in the negative electrode slurry.

A value obtained by dividing the amount of the dispersant by the amount of the binder may be 0.05 or more, particularly 0.1 or more, and more particularly 0.3 or more. Also, the value obtained by dividing the amount of the dispersant by the amount of the binder may be 3.5 or less, particularly 3 or less, and more particularly 2 or less. For example, the value obtained by dividing the amount of the dispersant by the amount of the binder may be in a range of 0.05 to 3.5, 0.05 to 3, or 0.05 to 2, particularly 0.1 to 3.5, 0.1 to 3, or 0.1 to 2, and more particularly 0.3 to 3.5, 0.3 to 3, or 0.3 to 2.

In a case in which the value obtained by dividing the amount of the dispersant by the amount of the binder satisfies the above range, the increase in the size of the slurry particles included in the negative electrode slurry may be further suppressed, and the negative electrode slurry may have more appropriate viscosity.

The negative electrode slurry according to the embodiment of the present invention may satisfy Equation 1 and Equation 2 at the same time. That is, in a case in which the negative electrode slurry according to the embodiment of the present invention satisfies Equation 1 and Equation 2 at the same time, the negative electrode slurry may have lower viscosity by more appropriately suppressing the increase in the viscosity while an amount of slurry particles having a diameter of 2 μm or more, which are included in the negative electrode slurry, may be significantly reduced because the increase in the size of the slurry particles included in the negative electrode slurry is more appropriately suppressed.

The dispersant may comprise a polymer having a repeating unit derived from one selected from the group consisting of polyvinyl butyral (PVB), polyvinyl alcohol (PVA), ethylene vinyl alcohol (EVOH), vinyl butyral, vinyl acetate, and vinyl alcohol, or a copolymer having repeating units derived from two or more selected therefrom, and may specifically comprise a ternary copolymer having repeating units respectively derived from vinyl butyral, vinyl acetate, and vinyl alcohol.

As described above, the negative electrode slurry according to the embodiment of the present invention may comprise particles having a diameter of 2 μm or more, that is, the slurry particles having a diameter of 2 μm or more, in an amount of 10 vol % or less, particularly 5 vol % or less, and more particularly 3 vol % or less. A volume fraction of the particles having a diameter of 2 μm or more, which are included in the negative electrode slurry, represents a fraction of an area in which the particle diameter is 2 μm or more in a particle size distribution (volume) when the particle size is measured by a laser diffraction method.

An increase in the amount of the slurry particles having a diameter of 2 μm or more, which are included in the negative electrode slurry, denotes that an amount of the lithium titanium oxide, which is not dispersed in the negative electrode slurry, but is agglomerated, is increased, and, in a case in which the lithium titanium oxide, as the negative electrode active material, is agglomerated as described above, since diffusion of ions in a negative electrode active material layer is reduced to cause a reduction in performance of the lithium secondary battery, it is important to ensure that the amount of the slurry particles having a diameter of 2 μm or more included is below a certain level. Since the negative electrode slurry according to the embodiment of the present invention may comprise the particles having a diameter of 2 μm or more in an amount within the above range, a lithium secondary battery comprising the same may exhibit better charge and discharge characteristics.

The negative electrode slurry according to the embodiment of the present invention may have a solid content of 45 wt % or more, particularly 50 wt % or more, and more particularly 52 wt % or more. An upper limit of the solid content may be 90 wt %, particularly 87 wt %, and more particularly 85 wt %.

Also, the negative electrode slurry of the present invention may have a viscosity of 0.1 Pa·s to 2 Pa·s, particularly 0.1 Pa·s to 1.5 Pa·s, and more particularly 0.1 Pa·s to 1.1 Pa·s at 25° C.

The negative electrode slurry of the present invention may satisfy the above viscosity range while satisfying the above solid content range. The fact that the negative electrode slurry of the present invention has such low viscosity within the above solid content range suggests the possibility of further increasing the solid content included in the negative electrode slurry.

That is, since an increase in the viscosity of the negative electrode slurry of the present invention may be suppressed, a ratio of the solid content may be relatively increased in comparison to a conventional negative electrode slurry comprising lithium titanium oxide. That is, since the increase in the viscosity of the negative electrode slurry is suppressed by comprising the dispersant comprising the polar OH group and the non-polar alkyl group, the negative electrode slurry according to the embodiment of the present invention may have lower viscosity than viscosity predicted by the solid content in the negative electrode slurry, and thus, a loading amount of the negative electrode may be increased by increasing the solid content in such a manner that an additional amount of the lithium titanium oxide is included. An effect of suppressing the increase in the viscosity of the negative electrode slurry may be more significantly achieved when the negative electrode slurry additionally satisfies Equation 1 or Equation 2, particularly, both of them.

Since the negative electrode slurry according to the embodiment of the present invention may have a solid content above the lower limit, an effect of increasing the loading amount of the negative electrode due to the high solid content may be achieved. In a case in which the solid content is greater than the above upper limit, coarsening of the negative electrode slurry particles may occur and, particularly, since the viscosity of the negative electrode slurry is increased above an appropriate level, processability during the preparation of the negative electrode may deteriorate.

Also, since the viscosity of the negative electrode slurry according to the embodiment of the present invention satisfies the above range, the solid content may be further appropriately increased, if necessary.

The lithium titanium oxide (LTO) included in the negative electrode slurry according to the embodiment of the present invention may be a secondary particle which is formed by agglomeration of primary particles comprising lithium titanium oxide.

The primary particle may be a nano-sized particle, wherein the nano-sized particles may increase the viscosity of the negative electrode slurry above an appropriate level when the nano-sized particles are included in the negative electrode slurry, and, since the nano-sized particles are sensitive to moisture, a large amount of water may be adsorbed on surfaces of the particles when the nano-sized particles are exposed to air, and thus, the nano-sized particles may deteriorate the processability of the electrode and characteristics of the battery. Thus, the negative electrode slurry according to the embodiment of the present invention may comprise lithium titanium oxide, as a secondary particle which is formed by agglomeration of the primary particles.

Since the lithium titanium oxide has a stable crystal structure, a small volume change due to charge and discharge, excellent cycle characteristics, and a high redox potential, an absolute amount of a solid electrolyte interface (SEI) formed and the resulting internal resistance are reduced, and thus, high-rate capability and high-current characteristics may be improved. Also, since the LTO itself may participate in the reaction as a redox site, a reduction in capacity of the battery may be minimized.

The secondary particle may have an average particle diameter ($D_{50}$) of 0.01 μm to 1 μm, particularly 0.1 μm to 0.95 μm, and more particularly 0.3 μm to 0.9 μm.

In a case in which the average particle diameter ($D_{50}$) of the lithium titanium oxide secondary particle is within the above range, since a specific surface area may be relatively increased due to the small particle size and a moving distance of lithium ions may be shortened to increase diffusion rate, a lithium secondary battery comprising the same may have a high output. In a case in which the average particle diameter ($D_{50}$) of the lithium titanium oxide secondary particle is less than the above range, since the viscosity of the negative electrode slurry is increased above an appropriate level, the negative electrode slurry requires an additional solvent, and thus, the solid content of the negative electrode slurry may be reduced. In a case in which the average particle diameter ($D_{50}$) of the lithium titanium oxide secondary particle is greater than the above range, since the lithium titanium oxide particle may not secure an appropriate specific surface area and the moving distance of the lithium ions may increase, an output of a lithium secondary battery comprising the same may be reduced.

The expression "primary particle" used in the specification of the present invention denotes an original particle when a different kind of particle is formed from one particle, and a secondary particle may be formed by aggregation, bonding, or assembly of a plurality of primary particles.

The expression "secondary particle" used in the present invention denotes a physically distinguishable large particle which is formed by aggregation, bonding, or assembly of each primary particle.

The lithium titanium oxide may have a specific surface area, which is measured by a Brunauer-Emmett-Teller (BET) method, of 0.1 m$^2$/g to 50 m$^2$/g, particularly 0.5 m$^2$/g to 20 m$^2$/g, and more particularly 1 m$^2$/g to 10 m$^2$/g. In a case in which the specific surface area of the lithium titanium oxide is within the above range, low electrical conductivity of the lithium titanium oxide may be compensated and a reduction in the output of the lithium secondary battery due to the low diffusion rate of the lithium ions may be compensated.

In the present invention, the average particle diameter ($D_{50}$) may be defined as a particle diameter at 50% in the cumulative particle diameter distribution. The average particle diameter is not particularly limited, but, for example, the average particle diameter may be measured by using a laser diffraction method or a scanning electron microscope (SEM) image. The laser diffraction method may generally measure a particle diameter ranging from a submicron level to a few mm, and may obtain highly repeatable and high resolution results.

The lithium titanium oxide, for example, may be represented by Formula 1 below.

$$Li_xTi_yO_4 \qquad \text{[Formula 1]}$$

In Formula 1, 0.5≤x≤3 and 1≤y≤2.5, for example, 0.8≤x≤2.8 and 1.3≤y≤2.3. Specific examples of the lithium titanium oxide may be one selected from the group consisting of $Li_{0.8}Ti_{2.2}O_4$, $Li_{2.67}Ti_{1.33}O_4$, $LiTi_2O_4$, $Li_{1.33}Ti_{1.67}O_4$, and $Li_{1.14}Ti_{1.71}O_4$, or a mixture of two or more thereof, but the present invention is not limited thereto.

The binder is not particularly limited as long as it is a typical binder used in the preparation of the negative electrode slurry, but, for example, various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, diacetyl cellulose, polyvinyl chloride, regenerated cellulose, polyvinylpyrrolidone, tetrafluoroethylene, polyethylene, polypropylene, poly acrylic acid, an ethylene-propylene-diene monomer (EPDM), a sulfonated EPDM, a styrene-butadiene rubber (SBR), a fluorine rubber, or various copolymers, may be used as the binder.

The binder may be used in an amount that satisfies Equation 2 in conjunction with the amount of the dispersant used. Typically, the amount of the binder included in the negative electrode slurry may be in a range of 20 wt % or less, particularly 0.1 wt % to 10 wt %, and more particularly 0.5 wt % to 4 wt % based on a total weight of the solid content of the negative electrode slurry.

The negative electrode slurry may further comprise a conductive agent, if necessary. Any conductive agent may be used without particular limitation so long as it has conductivity without causing adverse chemical changes in the battery, and examples of the conductive agent may be conductive materials such as: graphite such as natural graphite or artificial graphite; a carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 0.1 wt % to 15 wt %, for example, 1 wt % to 9 wt % based on the total weight of the solid content of the negative electrode slurry.

The negative electrode slurry may further comprise a thickener, if necessary.

The negative electrode slurry may comprise the thickener in an amount of 0.1 wt % to 3 wt %, particularly 0.2 wt % to 2 wt %, and more particularly 0.5 wt % to 1.5 wt % based on the total weight of the solid content of the negative electrode slurry.

In a case in which the negative electrode slurry comprises the thickener within the above range, since the thickener may exhibit an appropriate thickening effect, storage stability of the slurry may be secured, and at most a predetermined amount of the thickener is included in the negative electrode slurry so that the performance of the battery is not degraded.

The thickener may comprise at least one selected from the group consisting of carboxymethyl cellulose (CMC), hydroxypropyl cellulose, and regenerated cellulose, and may specifically comprise CMC.

The negative electrode slurry of the present invention comprises an organic solvent as a solvent. Water is mainly used as an aqueous solvent in a conventional negative electrode slurry, but, with respect to the lithium titanium oxide, since agglomeration occurs in the aqueous solvent by absorbing water, a non-aqueous organic solvent is included.

The organic solvent may comprise N-methylpyrrolidone (NMP), dimethylformamide (DMF), acetone, and dimethylacetamide, and these organic solvents may be used alone or in a mixture of two or more thereof. An amount of the organic solvent used may be sufficient so long as the solvent may dissolve and disperse the negative electrode active material and the binder in consideration of a coating thickness of the slurry and manufacturing yield.

Next, a method of preparing a negative electrode slurry according to the present invention will be described.

The negative electrode slurry according to the embodiment of the present invention may be prepared by a method comprising the steps of: (1) preparing a premixed slurry by mixing a binder, a lithium titanium oxide (LTO), a dispersant comprising a polar OH group and a non-polar alkyl group, and a solvent; and (2) stirring the premixed slurry, to which the dispersant is added, to disperse the premixed slurry.

In the method of preparing a negative electrode slurry, an amount of the binder dispersed in step (1) may be determined in consideration of an amount of the dispersant subsequently added to the negative electrode slurry, and thus, in the method of preparing a negative electrode slurry according to an embodiment of the present invention, a process of determining an appropriate amount of the dispersant included in the negative electrode slurry is first performed.

The amount of the dispersant may be determined as an amount that may satisfy Equation 1 below.

$$\frac{A}{B \cdot C} \geq 0.06 \qquad \text{[Equation 1]}$$

In Equation 1, A is an amount (wt %) of a repeating unit derived from a monomer containing a polar OH group in the dispersant, B is a weight-average molecular weight (Kg/mol) of the dispersant, and C is weight (parts by weight) of the dispersant based on 100 parts by weight of the lithium titanium oxide.

A value, which is obtained by dividing the amount of the repeating unit derived from the monomer containing a polar OH group in the dispersant by the product of the weight-average molecular weight of the dispersant and the weight of the dispersant based on 100 parts by weight of the lithium titanium oxide, may be 0.06 or more, particularly 0.07 or more, and more particularly 0.08 or more.

In a case in which a type of the dispersant desired to be used in the negative electrode slurry is determined, since the amount (A) of the repeating unit derived from the monomer containing a polar OH group in the dispersant and the weight-average molecular weight (B) of the dispersant become fixed values, the amount of the dispersant may be determined by a method of confirming whether or not a value, which is calculated by determining the weight of the dispersant based on 100 parts by weight of the lithium titanium oxide included in the negative electrode slurry, is equal to or greater than the above value.

After the amount of the dispersant is determined as described above, an appropriate amount of the binder may be derived from Equation 2 below.

$$0.05 \le \frac{\text{Dispersant amount}}{\text{Binder amount}} \le 3.5 \qquad \text{[Equation 2]}$$

(in Equation 2, the amount of the dispersant and the amount of the binder respectively represent parts by weight of the dispersant and the binder based on 100 parts by weight of the negative electrode slurry)

A value obtained by dividing the amount of the dispersant by the amount of the binder may be 0.05 or more, particularly 0.1 or more, and more particularly 0.3 or more. Also, the value obtained by dividing the amount of the dispersant by the amount of the binder may be 3.5 or less, particularly 3 or less, and more particularly 2 or less. Thus, the value obtained by dividing the amount of the dispersant by the amount of the binder, for example, may be in a range of 0.05 to 3.5, 0.05 to 3, or 0.05 to 2, particularly 0.1 to 3.5, 0.1 to 3, or 0.1 to 2, and more particularly 0.3 to 3.5, 0.3 to 3, or 0.3 to 2.

Accordingly, the negative electrode slurry according to the embodiment of the present invention may satisfy Equation 1 and Equation 2 at the same time. That is, in a case in which the negative electrode slurry according to the embodiment of the present invention satisfies Equation 1 and Equation 2 at the same time, since the increase in the size of the slurry particles included in the negative electrode slurry is more suppressed, the increase in the viscosity may be more significantly suppressed while an amount of slurry particles having a diameter of 2 μm or more, which are included in the negative electrode slurry, may be reduced.

In step (1), a premixed slurry is prepared by mixing a binder, a lithium titanium oxide (LTO), a dispersant comprising a polar OH group and a non-polar alkyl group, and an organic solvent.

The preparation of the premixed slurry may also be performed by mixing the binder, the lithium titanium oxide (LTO), the dispersant comprising a polar OH group and a non-polar alkyl group, and the organic solvent at the same time, or may also be performed by a method in which some components are first mixed and the remaining components are then mixed.

In the method of preparing a negative electrode slurry according to the embodiment of the present invention, the premixed slurry of step (1), for example, may be prepared by a method comprising the steps of: (1-1) mixing the binder, the lithium titanium oxide (LTO), and the solvent; and (1-2) preparing a premixed slurry by adding the dispersant comprising a polar OH group and a non-polar alkyl group to the mixture obtained in step (1-1).

Also, in a case in which an amount of the lithium titanium oxide (LTO) is high in the premixed slurry desired to be prepared in step (1), for example, in a case in which the premixed slurry comprises the lithium titanium oxide (LTO) in an amount of 45 wt % or more, particularly 50 wt % or more, and more particularly 52 wt % or more based on a total weight of the premixed slurry, the preparing of the premixed slurry in step (1) may be performed by a method comprising the steps of: (1-A) preparing a dispersant solution by mixing the dispersant comprising a polar OH group and a non-polar alkyl group with the organic solvent; and (1-B) preparing a premixed slurry by mixing the binder and the lithium titanium oxide (LTO) with the dispersant solution.

The premixed slurry prepared in step (1) may also be prepared by a method in which, after each of the binder, the lithium titanium oxide (LTO), and the dispersant comprising a polar OH group and a non-polar alkyl group is first mixed in the organic solvent, all of the mixtures are mixed.

The mixing may be performed by a conventional mixing method, a milling method, such as ball milling, bead milling, basket milling, and planetary milling, or a method using a mixing device such as a homo disper mixer, a homogenizer, a bead mill, a ball mill, a basket mill, an attrition mill, a universal stirrer, a clear mixer, a saw type impeller, or a TK mixer.

The mixing may be performed by a method of mixing at a speed of 1,000 rpm to 10,000 rpm, for example, 3,000 rpm to 7,000 rpm, for 10 minutes to 1 hour, for example, 20 minutes to 40 minutes.

In step (2), the premixed slurry, to which the dispersant is added, is stirred to disperse the premixed slurry.

Before the stirring in step (2), an organic solvent may be additionally added to the premixed slurry, if necessary. The additional organic solvent may be the same type as the organic solvent that disperses the binder in step (1), and, since a concentration of the premixed slurry is adjusted by the additional addition of the organic solvent, the solid content of the negative electrode slurry prepared may be adjusted. The negative electrode slurry may be prepared by the dispersion in step (2).

The dispersion may be performed by a conventional mixing method, a milling method, such as ball milling, bead milling, basket milling, and planetary milling, or a method using a mixing device such as a homo disper mixer, a homogenizer, a bead mill, a ball mill, a basket mill, an attrition mill, a universal stirrer, a clear mixer, a saw type impeller, or a TK mixer, and may be performed by mixing with a shaker.

In the method of preparing a negative electrode slurry according to the embodiment of the present invention, the dispersion by the stirring, for example, may be performed by using a shaker, and the mixing with the shaker (shaking) may be performed by a method of adding beads to the premixed slurry desired to be mixed, to which the dispersant is added, and shaking at a speed of 100 rpm to 1,000 rpm, for example, 200 rpm to 500 rpm, for 5 hours to 24 hours, for example, 12 hours to 18 hours.

A size of the beads may be appropriately determined depending on types and amounts of the negative electrode active material and the binder and a type of the dispersant, and a diameter of the beads may specifically be in a range of 0.5 mm to 5 mm.

The present invention provides a negative electrode for a lithium secondary battery which comprises the negative electrode slurry, and the present invention also provides a lithium secondary battery comprising the negative electrode.

The lithium secondary battery may comprise a positive electrode, a negative electrode, and a separator disposed between the positive electrode and the negative electrode.

The negative electrode may be prepared by a typical method of preparing a negative electrode, which is known in the art, using the negative electrode slurry prepared by the above-described method of preparing a negative electrode slurry.

A negative electrode collector used in the negative electrode according to an embodiment of the present invention may have a thickness of 3 μm to 500 μm. The negative electrode collector is not particularly limited as long as it has conductivity without causing adverse chemical changes in the battery, and, for example, copper, gold, stainless steel, aluminum, nickel, titanium, fired carbon, copper or stainless steel that is surface-treated with one of carbon, nickel, titanium, silver, or the like, and an aluminum-cadmium alloy may be used. Also, microscopic irregularities may be formed on the surface of the negative electrode collector to improve the adhesion of the negative electrode active material, and the negative electrode collector may be used in various shapes such as a film, a sheet, a foil, a net, a porous body, a foam body, a non-woven fabric body, and the like.

A filler may be included in the negative electrode slurry, if necessary.

The filler, as an auxiliary component inhibiting expansion of the electrode, is not particularly limited as long as it is a fibrous material while not causing adverse chemical changes in the battery, and, for example, the filler may comprise olefin-based polymers, such as polyethylene and polypropylene, and fibrous materials, such as glass fibers and carbon fibers.

The positive electrode may be prepared by a typical method known in the art. For example, a solvent, the above-described binder, a conductive agent, and a dispersant are mixed with a positive electrode active material and stirred to prepare a slurry, a metal current collector is then coated with the slurry and pressed, and the positive electrode may then be prepared by drying the coated metal current collector.

The metal current collector is a metal with high conductivity, wherein the metal current collector is not particularly limited so long as it, as a metal to which the slurry of the positive electrode active material may be easily adhered, has high conductivity without causing adverse chemical changes in the battery in a voltage range of the battery, and, for example, stainless steel, aluminum, nickel, titanium, fired carbon, or aluminum or stainless steel that is surface-treated with one of carbon, nickel, titanium, silver, or the like may be used. Also, the metal current collector may have a microscopic uneven surface to improve the adhesion of the positive electrode active material. The current collector may be used in various shapes, such as a film, a sheet, a foil, a net, a porous body, a foam body, a non-woven fabric body, and the like, and may have a thickness of 3 μm to 500 μm.

Examples of the positive electrode active material may be lithium cobalt oxide ($LiCoO_2$); lithium nickel oxide ($LiNiO_2$); $Li[Ni_aCo_bMn_cM^1_d]O_2$ (where $M^1$ is at least one element selected from the group consisting of aluminum (Al), gallium (Ga), and indium (In), $0.3 \leq a < 1.0$, $0 \leq b \leq 0.5$, $0 \leq c \leq 0.5$, $0 \leq d \leq 0.1$, and $a+b+c+d=1$); a layered compound, such as $Li(Li_eM^2_{f-e-f}M^3_f)O_{2-g}A_g$ (where $0 \leq e \leq 0.2$, $0.6 \leq f \leq 1$, $0 \leq f' \leq 0.2$, $0 \leq g \leq 0.2$, $M^2$ comprises manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}O_4$ (where $0 \leq h \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_7O_7$; Ni-site type lithium nickel oxide represented by the chemical formula $LiNi_{1-i}M^4_iO_2$ (where $M^4$=Co, Mn, Al, Cu, Fe, Mg, B, or Ga, and $0.01 \leq i \leq 0.3$); lithium manganese composite oxide represented by the chemical formula $LiMn_{2-j}M^5_jO_2$ (where $M^5$=Co, Ni, Fe, Cr, Zn, or tantalum (Ta), and $0.01 \leq j \leq 0.1$) or $Li_2Mn_3M^6O_8$ (where $M^6$=Fe, Co, Ni, Cu, or Zn); $LiMn_2O_4$ having a part of Li being substituted with alkaline earth metal ions; a disulfide compound; $LiFe_3O_4$, or $Fe_2(MoO_4)_3$, but the positive electrode active material is not limited thereto.

The positive electrode active material may be comprised in an amount of 50 wt % to 99 wt %, for example, 70 wt % to 98 wt % based on a total weight of solid content of the positive electrode slurry.

An organic solvent, such as N-methylpyrrolidone (NMP), dimethylformamide (DMF), acetone, and dimethylacetamide, or water may be used as the solvent used for forming the positive electrode. These solvents may be used alone or in a mixture of two or more thereof. An amount of the solvent used may be sufficient so long as the solvent may dissolve and disperse the positive electrode active material, the binder, and the conductive agent in consideration of a coating thickness of the slurry and manufacturing yield.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. The conductive agent may be used in an amount of 1 wt % to 20 wt % based on the total weight of the solid content of the positive electrode slurry.

An aqueous dispersant or an organic dispersant, such as N-methyl-2-pyrrolidone, may be used as the dispersant. The dispersant may be used in an amount of 0.01 wt % to 10 wt % based on the total weight of the solid content of the positive electrode slurry.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the separator is not limited thereto.

A lithium salt, which may be included as an electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3$, $CF_3CO_2^-$, $CH_3CO_2^-$, $SCN^-$, and $(CF_3CF_2SO_2)_2N^-$ may be used as an anion of the lithium salt.

In an electrolyte solution used in the present invention, an organic solvent included in the electrolyte solution may be used without limitation so long as it is typically used in an electrolyte solution for a secondary battery, and typically, one selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran, or a mixture of two or more thereof may be used. Specifically, ethylene carbonate and propylene carbonate, ring-type carbonates among the carbonate-based organic solvents, well dissociate a lithium salt in the electrolyte solution due to high dielectric constants as high-viscosity organic solvents, and thus, the ring-type carbonate may be preferably used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, such a combined use may be more preferable.

Selectively, the electrolyte solution stored according to the present invention may further comprise an additive, such as an overcharge inhibitor, which is included in a conventional electrolyte solution.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module comprising a plurality of battery cells.

EXAMPLES

Hereinafter, the present invention will be described in detail, according to examples and experimental examples, but the present invention is not limited to these examples and experimental examples. The invention may be embodied in many different forms and should not be construed as being limited to the embodiments set forth herein. Rather, these example embodiments are provided so that this description will be thorough and complete, and will fully convey the scope of the present invention to those skilled in the art.

Example 1

<Preparation of Premixed Slurry>

301.41 g of $Li_4Ti_5O_{12}$ having a diameter ($D_{50}$) of 0.75 μm and a specific surface area of 6.3 m$^2$/g was added to a solution in which 3.59 g of a binder (PVDF) was dissolved in 195 g of an organic solvent (NMP) and mixed using a saw type impeller having a diameter of 80 mm (manufactured by VMA-GETZMANN GMBH, DISPERMAT CN20) at 5,000 rpm for 30 minutes to prepare a premixed LTO slurry.

After the premixed LTO slurry was diluted 1,000 times with NMP, its particle size distribution was measured using a laser diffractometer (manufactured by Malvern Instruments, Mastersizer 3000) and the results thereof are presented in Table 1 below. Specifically, an average particle diameter (DIO), as a particle diameter at 10% in a cumulative particle diameter distribution, an average particle diameter ($D_{50}$), as a particle diameter at 50% in the cumulative particle diameter distribution, and an average particle diameter ($D_{90}$) as a particle diameter at 90% in the cumulative particle diameter distribution, were measured, and a fraction (vol %) of particles having a diameter of 2 μm or more was measured and presented in Table 1 below.

TABLE 1

| Particle diameter of premixed LTO slurry (μm) | | | |
|---|---|---|---|
| $D_{10}$ | $D_{50}$ | $D_{90}$ | Amount of particles having a diameter of 2 μm or more (vol %) |
| 0.425 | 1.16 | 10.6 | 27.12 |

<Addition of Dispersant>

43.45 g of the premixed LTO slurry prepared was put in a 125 mL Nalgene tube, and 0.131 g of a dispersant (dispersant 1) and an organic solvent (NMP) were added thereto to adjust a weight of the slurry to be 50 g. In this case, a polymer dispersant, which included 72 wt % of a repeating unit derived from butyral, 2.5 wt % of a repeating unit derived from vinyl acetate, a nd 25.5 wt % of a repeating unit derived from vinyl alcohol in the molecule, and had a molecular weight of 57 kg/mol, was used as the dispersant.

<Dispersion of Slurry>

A negative electrode slurry was prepared by adding 100 g of zirconia beads having a diameter of 3 mm to the slurry and dispersing the slurry by shaking the slurry using a shaker at 300 rpm for 15 hours.

Examples 2 to 7

Negative electrode slurries were prepared in the same manner as in Example 1 except that different types and amounts of dispersants shown in the following Table 2 were respectively used instead of dispersant 1 in Example 1.

TABLE 2

| Examples | Dispersant (amount, g) | Derived repeating unit included in the molecule (wt %) | | | Molecular weight (Kg/mol) |
| --- | --- | --- | --- | --- | --- |
| | | Butyral | Vinyl acetate | Vinyl alcohol | |
| Example 1 | Dispersant 1 (0.131) | 72 | 2.5 | 25.5 | 57 |
| Example 2 | Dispersant 1 (0.524) | 72 | 2.5 | 25.5 | 57 |
| Example 3 | Dispersant 2 (0.262) | 85 | 2.5 | 12.5 | 99 |
| Example 4 | Dispersant 3 (0.262) | 74.1 | 2.3 | 23.6 | 160 |
| Example 5 | Dispersant 4 (0.524) | 82.6 | 2.4 | 14.9 | 156 |
| Example 6 | Dispersant 1 (0.524) | 72 | 2.5 | 25.5 | 57 |
| Example 7 | Dispersant 1 (0.524) | 72 | 2.5 | 25.5 | 57 |

Comparative Example 1

A negative electrode slurry was prepared in the same manner as in Example 1 except that 0.524 g of polyvinylpyrrolidone (PVP) was used instead of dispersant 1 in Example 1.

Comparative Example 2

A negative electrode slurry was prepared in the same manner as in Example 2 except that 0.524 g of hydrogenated nitrile rubber (HNBR) was used instead of dispersant 1 in Example 2.

Comparative Example 3

A negative electrode slurry was prepared in the same manner as in Example 2 except that 0.524 g of polyvinyl alcohol (PVA) was used instead of dispersant 1 in Example 2. Polyvinyl alcohol comprising 1.9 wt % of a repeating unit derived from vinyl acetate and 98.1 wt % of a repeating unit derived from vinyl alcohol was used as the above polyvinyl alcohol.

An amount of the lithium titanium oxide, an amount of the dispersant, and an amount of the binder included in each of the negative electrode slurries respectively prepared in Examples 1 to 7 and Comparative Examples 1 to 3 are presented in Table 3 below.

TABLE 3

| | Dispersant | LTO amount (wt %) | Dispersant amount (wt %) | Binder amount (wt %) |
| --- | --- | --- | --- | --- |
| Example 1 | Dispersant 1 | 52.4 | 0.264 | 0.624 |
| Example 2 | Dispersant 1 | 52.4 | 1.05 | 0.624 |
| Example 3 | Dispersant 2 | 52.4 | 0.524 | 0.624 |
| Example 4 | Dispersant 3 | 52.4 | 0.524 | 0.624 |
| Example 5 | Dispersant 4 | 52.4 | 1.05 | 0.624 |
| Example 6 | Dispersant 1 | 52.4 | 0.026 | 0.524 |
| Example 7 | Dispersant 1 | 52.4 | 0.021 | 0.460 |
| Comparative Example 1 | PVP | 52.4 | 1.05 | 0.624 |
| Comparative Example 2 | HNBR | 52.4 | 1.05 | 0.624 |
| Comparative Example 3 | PVA | 52.4 | 0.131 | 0.624 |

EXPERIMENTAL EXAMPLE

After each of the negative electrode slurries respectively prepared in Examples 1 to 7 and Comparative Examples 1 to 3 was diluted 1,000 times with NMP, an amount of particles having a diameter of 2 μm or more among particles included in each negative electrode slurry was measured using a laser diffractometer (manufactured by Malvern Instruments, Mastersizer 3000), and the results thereof are presented in Table 4 below.

Also, viscosities of the negative electrode slurries respectively prepared in Examples 1 to 7 and Comparative Examples 1 to 3 were measured using a viscometer (manufactured by TOKI SANGYO CO., LTD., viscometer TV-22) at 1 rpm and 25° C., and the results thereof are presented in Table 4 below.

Calculated values of Equations 1 and 2 for the negative electrode slurries respectively prepared in Examples 1 to 7 and Comparative Examples 1 to 3 are also presented in Table 4 below.

TABLE 4

| | Dispersant | A/B*C | Dispersant (wt %)/ binder (wt %) | Amount of particles having a diameter of 2 μm or more (vol %) | Viscosity (Pa · s) |
| --- | --- | --- | --- | --- | --- |
| Example 1 | Dispersant 1 | 0.895 | 0.420 | 0.57 | 0.63 |
| Example 2 | Dispersant 1 | 0.224 | 1.679 | 1.12 | 0.76 |
| Example 3 | Dispersant 2 | 0.126 | 0.840 | 1.67 | 0.98 |
| Example 4 | Dispersant 3 | 0.148 | 0.840 | 2.18 | 1.01 |
| Example 5 | Dispersant 4 | 0.048 | 1.679 | 7.1 | 1.66 |
| Example 6 | Dispersant 1 | 8.947 | 0.050 | 4.82 | 0.59 |
| Example 7 | Dispersant 1 | 11.184 | 0.080 | 5.26 | 0.55 |
| Comparative Example 1 | PVP | 0 | 1.679 | 6.56 | 4.18 |
| Comparative Example 2 | HNBR | 0 | 1.679 | 52.75 | 15.27 |
| Comparative Example 3 | PVA | 12.658 | 0.210 | 11.87 | 5.43 |

In Table 4, A, B and C are as defined in Equation 1.

Referring to Table 4, with respect to the negative electrode slurries of Examples 1 to 7, it may be confirmed that the amount of the particles having a diameter of 2 μm or more was small and the viscosity of each slurry was low. As confirmed in Table 1, the amount of the slurry particles having a diameter of 2 μm or more, which was 27.12 vol % in the premixed LTO slurry before the dispersant was added, was reduced to 7.1 vol % (Example 5) or less by the addition of the dispersant, and thus, it may be confirmed that the lithium titanium oxide included in the negative electrode slurry was effectively dispersed. Also, the viscosities of the negative electrode slurries were low at 1.66 Pa·s (Example 5) or less. From these results, since the negative electrode slurry of the present invention had low slurry viscosity while coarsening of the particles was suppressed due to excellent dispersibility, it may be confirmed that an increase in viscosity, which may occur when lithium titanium oxide having a small diameter ($D_{50}$ of 1 μm or less) was used, was addressed.

In contrast, since the negative electrode slurries of Comparative Examples 1 and 2 respectively included the polyvinylpyrrolidone (PVP) and the hydrogenated nitrile rubber (HNBR), which were typically used as a dispersant in an organic solvent, exhibited high viscosity and included a large amount of the slurry particles having a diameter of 2 μm or more, it may be confirmed that dispersibility of the negative electrode slurry comprising the lithium titanium oxide was affected by the type of the dispersant. Particularly, with respect to the hydrogenated nitrile rubber (HNBR) with few polar moieties in its molecular structure (Comparative Example 2), since the amount of the slurry particles having a diameter of 2 μm or more was significantly increased in comparison to that included in the premixed LTO slurry and the viscosity was also relative high, it may be confirmed that the dispersibility of the negative electrode slurry was poor and the increase in the viscosity, which may occur when lithium titanium oxide having a small diameter was used, was rather deteriorated.

With respect to each of the negative electrode slurries of Examples 1 to 4, 6, and 7 which satisfied all conditions of Equations 1 and 2, since the amount of the slurry particles having a diameter of 2 μm or more was smaller and the viscosity was lower than that of Example 5 which did not satisfy the conditions of Equation 1, it may be confirmed that a better effect may be achieved when the conditions of Equations 1 and 2 were all satisfied.

The invention claimed is:

1. A negative electrode slurry comprising:
a lithium titanium oxide;
a dispersant comprising a polar OH group and a non-polar alkyl group;
a binder; and
an organic solvent,
wherein the negative electrode slurry satisfies Equation 1:

$$\frac{A}{B \cdot C} \geq 0.06 \qquad \text{[Equation 1]}$$

wherein, in Equation 1,
A is an amount (wt %) of a repeating unit derived from a monomer containing the polar OH group in the dispersant, in the range of 1 to 50,
B is a weight-average molecular weight (Kg/mol) of the dispersant, and
C is a weight (parts by weight) of the dispersant based on 100 parts by weight of the lithium titanium oxide.

2. The negative electrode slurry of claim 1, wherein the negative electrode slurry satisfies Equation 2:

$$0.05 \leq \frac{\text{Dispersant amount}}{\text{Binder amount}} \leq 3.5 \qquad \text{[Equation 2]}$$

wherein, in Equation 2, the amount of the dispersant and the amount of the binder respectively represent parts by weight of the dispersant and the binder based on 100 parts by weight of the negative electrode slurry.

3. The negative electrode slurry of claim 1, wherein the negative electrode slurry comprises particles having a diameter of 2 μm or more in an amount of 10 vol % or less.

4. The negative electrode slurry of claim 1, wherein the lithium titanium oxide is a secondary particle which is formed by agglomeration of primary particles comprising lithium titanium oxide, and
the secondary particle has an average particle diameter ($D_{50}$) of 0.01 μm to 1 μm.

5. The negative electrode slurry of claim 1, wherein the lithium titanium oxide has a specific surface area, which is measured by a Brunauer-Emmett-Teller (BET) method, of 0.1 m$^2$/g to 50 m$^2$/g.

6. The negative electrode slurry of claim 1, wherein the lithium titanium oxide is represented by Formula 1:

$$Li_xTi_yO_4 \qquad \text{[Formula 1]}$$

wherein, in Formula 1, 0.5≤x≤3 and 1≤y≤2.5.

7. The negative electrode slurry of claim 1, wherein the dispersant comprises a polymer having a repeating unit derived from one selected from the group consisting of polyvinyl butyral (PVB), polyvinyl alcohol (PVA), ethylene vinyl alcohol (EVOH), vinyl butyral, vinyl acetate, and vinyl alcohol, or a copolymer having repeating units derived from two or more selected therefrom.

8. The negative electrode slurry of claim 1, wherein the negative electrode slurry has a viscosity of 0.1 Pa·s to 2 Pa·s at 25° C.

9. The negative electrode slurry of claim 1, wherein the negative electrode slurry, has a solid content of 45 wt % or more.

10. A method of preparing the negative electrode slurry of claim 1, the method comprising steps of:
(1) preparing a premixed slurry by mixing the binder, the lithium titanium oxide, the dispersant, and the organic solvent; and
(2) stirring the premixed slurry, to which the dispersant is added, to disperse the premixed slurry.

11. The method of claim 10, wherein the step (1) comprises steps of:
(1-A) preparing a dispersant solution by mixing the dispersant comprising the polar OH group and the non-polar alkyl group with the organic solvent; and
(1-B) preparing a premixed slurry by mixing the binder and the lithium titanium oxide with the dispersant solution,
wherein the premixed slurry comprises the lithium titanium oxide in an amount of 45 wt % or more based on a total weight of the premixed slurry.

12. A negative electrode for a lithium secondary battery, comprising the negative electrode slurry of claim 1.

13. A lithium secondary battery comprising the negative electrode of claim 12.

14. The negative electrode slurry of to claim 1, wherein the dispersant comprises a repeating unit derived from a monomer containing the polar OH group and a repeating unit derived from a monomer containing the non-polar alkyl group.

* * * * *